Figures 1, 2, 3:
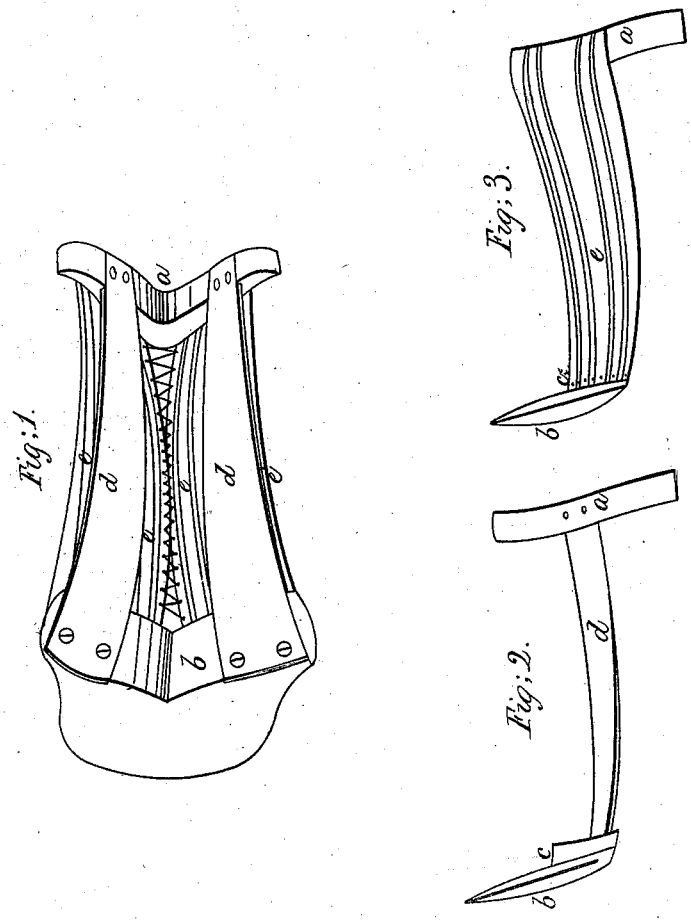

D. Irwin,
Riding Saddle.
Nº 2,544. Patented Apr. 11, 1842.

UNITED STATES PATENT OFFICE.

DAVID IRVIN, OF MADISON, WISCONSIN.

SADDLE.

Specification of Letters Patent No. 2,544, dated April 11, 1842.

*To all whom it may concern:*

Be it known that I, DAVID IRVIN, of Madison city, county of Dane, and Territory of Wisconsin, have invented a new and useful Improvement in Spring-Saddles, and that the following is a full, clear, and exact description thereof, reference being had to the accompanying drawings, making a part of the same, in which—

Figure 1, is the under side of the saddle. Fig. 2, side of frame, with webbing detached. Fig. 3, side view, with webbing attached.

I form the tree ($a$) of the saddle somewhat like those in common use, only more elevated in thickness; the cantle ($b$) is also formed like that of the common saddle, excepting that it has a projection ($c$) on the forward side, at some distance above the lower edge which curves over in the form of the seat of the saddle; to the under side of this cantle and tree is affixed a flat steel spring ($d$) on each side, where the bars of a common saddle are situated so curved as to fit the back of the horse, and lay flat thereon, thus taking the place entirely of the saddle bars; the webbing ($e$) is fastened securely to the front of the tree, drawn over it backward, and firmly stretched and nailed, or otherwise fastened, to the projection ($c$) on the cantle, thus giving the saddle an easy and lasting spring. This frame can be padded and covered in any of the usual ways.

What I claim as my invention and desire to secure by Letters Patent, is—

The projection on the forward side of the cantle, above its lower edge, in the manner and for the purpose above described.

DAVID IRVIN.

Witnesses:
 J. J. GREENOUGH,
 ARTHUR L. McINTIRE.